(12) United States Patent
Muldoon

(10) Patent No.: US 6,343,768 B1
(45) Date of Patent: Feb. 5, 2002

(54) VERTICAL/SHORT TAKE-OFF AND LANDING AIRCRAFT

(76) Inventor: Patrick John Muldoon, 1071 Sinking Creek Rd., Pembroke, VA (US) 24136

( * ) Notice: Subject to any disclaimer, the term of this patent is extended or adjusted under 35 U.S.C. 154(b) by 0 days.

(21) Appl. No.: 09/571,815

(22) Filed: May 16, 2000

(51) Int. Cl.$^7$ .............................................. B64C 27/28
(52) U.S. Cl. ...................................... 244/7 R; 244/56
(58) Field of Search ............................. 244/6, 12.4, 56, 244/66, 12.3, 7 R, 7 C, 7 B, 23 R

(56) References Cited

U.S. PATENT DOCUMENTS

| | | | |
|---|---|---|---|
| 1,822,386 A | * 9/1931 | Anderson | 244/12.4 |
| 2,961,188 A | * 11/1960 | Taylor | 244/12.4 |
| 3,049,320 A | 8/1962 | Fletcher | 244/12.4 |
| 3,066,888 A | 12/1962 | Doak | 244/12.1 |
| 3,078,062 A | 2/1963 | Fischer | 244/65 |
| 3,083,934 A | 4/1963 | Vanderlip | 244/5 |
| 3,117,746 A | 1/1964 | Taylor | 244/12.4 |
| 3,254,725 A | 6/1966 | Higgins | 244/7 R |
| 3,322,223 A | 5/1967 | Bertelsen | 244/12.1 |
| 3,335,977 A | 8/1967 | Meditz | 244/12.4 |
| 3,350,035 A | 10/1967 | Schlieben | 244/7 R |
| 3,379,395 A | 4/1968 | Smith | 244/12.1 |
| 3,559,922 A | 2/1971 | Gluhareff | 244/17.17 |
| 3,572,614 A | 3/1971 | Bertelsen | 244/12.1 |

(List continued on next page.)

*Primary Examiner*—Charles T. Jordan
*Assistant Examiner*—Tien Dinh
(74) *Attorney, Agent, or Firm*—Patrick Craig Muldoon

(57) ABSTRACT

A tilt-rotor aircraft capable of vertical/short take-off and landing. The aircraft utilizes a co-axial counter rotating rotor system to provide vertical and horizontal thrust. The fuselage is positioned over the forward half of the rotor in the vertical take-off configuration and the rotors rotate ninety degrees to provide horizontal thrust in the forward flight mode. The aircraft uses conventional flight control surfaces during forward flight and uses cyclic rotor pitch control or a series of control surfaces located in the rotor wash to control the aircraft during vertical flight. One or more engines powering the rotor system provide thrust for the aircraft. The engine(s) can be located in the fuselage or in the wings. The aircraft uses lifting airfoils during forward flight which can include a wing/tail or a canard/wing configuration and uses a conventional tail for directional stability and control. The rotor transmission allows one rotor to be braked thus increasing the rotation speed of the other rotor during forward flight.

21 Claims, 10 Drawing Sheets

U.S. PATENT DOCUMENTS

| | | | |
|---|---|---|---|
| 3,666,209 A | 5/1972 | Taylor | 244/7 C |
| 3,712,406 A | 1/1973 | Bertelsen | 244/12.1 |
| 3,915,411 A | 10/1975 | Surbaugh | 244/12.2 |
| RE29,023 E * | 11/1976 | Malvestuto, Jr. | 244/6 |
| 4,037,807 A | 7/1977 | Johnston et al. | 244/12.1 |
| 4,426,049 A * | 1/1984 | Stewart | 244/69 |
| 4,537,372 A | 8/1985 | Forizs | 244/12.4 |
| 4,828,058 A | 5/1989 | Bjorn-Ake | 244/12.4 |
| 4,828,205 A | 5/1989 | Durand | 244/23 R |
| 4,865,275 A | 9/1989 | Thompson | 244/219 |
| 5,026,002 A | 6/1991 | Yarrington | 244/12.1 |
| 5,035,377 A | 7/1991 | Buchelt | 244/12.1 |
| 5,054,716 A | 10/1991 | Wilson | 244/56 |
| 5,065,833 A | 11/1991 | Matsuoka et al. | 244/12.1 |
| 5,096,140 A | 3/1992 | Dornier, Jr. et al. | 244/12.4 |
| 5,145,129 A | 9/1992 | Gebhard | 244/12.5 |
| 5,178,344 A | 1/1993 | Dlouhy | 244/12.2 |
| 5,242,132 A * | 9/1993 | Wukowitz | 244/106 |
| 5,244,167 A | 9/1993 | Turk et al. | 244/12.1 |
| 5,289,994 A | 3/1994 | Del Campo Aguilera | 244/12.1 |
| 5,314,035 A | 5/1994 | Schoell | 244/12.1 |
| 5,357,894 A | 10/1994 | Jacobson | 244/12.1 |
| 5,395,073 A | 3/1995 | Rutan et al. | 244/7 R |
| 5,407,150 A | 4/1995 | Sadleir | 244/12.4 |
| 5,419,514 A | 5/1995 | Duncan | 244/12.4 |
| 5,433,400 A | 7/1995 | Singhal et al. | 244/12.1 |
| 5,597,137 A | 1/1997 | Skoglun | 244/12.4 |
| 5,653,404 A | 8/1997 | Ploshkin | 244/12.2 |
| 5,746,390 A | 5/1998 | Chiappetta | 244/12.3 |
| 5,758,844 A | 6/1998 | Cummings | 244/7 C |
| 5,839,691 A | 11/1998 | Lariviere | 244/7 R |
| 5,863,013 A | 1/1999 | Schmittle | 244/7 R |
| RE36,487 E | 1/2000 | Wainfan | 244/7 C |
| D418,805 S * | 1/2000 | Cycon et al. | 244/12.3 |
| 6,113,029 A | 9/2000 | Salinas | 244/23 C |
| 6,170,778 B1 * | 1/2001 | Cycon et al. | 244/12.3 |

* cited by examiner

VERTICAL/SHORT TAKE-OFF AND LANDING AIRCRAFT

BACKGROUND OF THE INVENTION

The present invention relates to vertical/short take-off and landing (V/STOL) aircraft and more particularly to the use of an articulated rotor propulsion system for providing VTOL and high-speed horizontal flight.

Aircraft having propellers or rotors located symmetrically on both sides of the aircraft and capable of being rotated 90 degrees upward from a horizontal axis position are known as tilt-rotor/tilt propeller aircraft. The rotors' vertical axis positioning directs airflow downward and thrust upward and allows the aircraft to move in a vertical plane or to simply hover. Positioning the propellers' or rotors' axis horizontally directs the thrust forward and allows for conventional level flight. In this latter configuration, lift is provided by the flow of air around lifting surfaces such as wings or horizontal stabilizers. In between, the generally vertical and generally horizontal axis configuration, any tilt angle can be obtained, resulting in various corresponding oblique flight paths and acceleration-deceleration phases also known as forward and backwards transitions.

Such aircraft combine a helicopter's slow flight capability with its ability to take off or land vertically and a conventional airplane's capacity for high-speed level flight. An airplane can attain about twice the speed of a typical helicopter; over 300 miles per hour, opposed to less than 170 miles per hour for a helicopter. However, a typical prior art tilt-rotor aircraft's inherent mechanical and structural complexity increases its empty weight over that of a similarly sized airplane while also increasing production cost. Furthermore, such an aircraft's development in terms of aerodynamic qualities, stability, flight dynamics and control is made more difficult due to the aerodynamic effects at slow speeds and the mass of air displaced by the propeller around the aircraft's various lifting surfaces. This mass of air is known as propeller wash or simply as prop wash.

Propellers or rotors are usually attached to engines mounted on either end of a wing which serves as a structural support. However, this setup causes a problem during the transition from vertical to horizontal flight. The changes in the angle of the direction of the prop wash do not vary directly with the changes in the angle at which the propellers are tilted. As long as the horizontal velocity and the resulting lift from the conventional lifting surfaces have relatively low values, most of the lift is provided by the propellers or rotors. Because of this phenomenon, the propellers will tilt forward very slowly as the aircraft begins a transition to level flight and then the propellers will tilt forward faster as the wings begin to provide more of the lift. On the contrary, the tilt angle of the prop wash changes rapidly at first but the change slows down as the aircraft completes transition from vertical to horizontal flight.

Up to this time, in the prior art, the following two configurations have been used to try to avoid the problems caused by the different rates at which the propellers and their resulting prop wash tilt with respect to the wing;

The horizontal wing is permanently fixed to the aircraft and the propellers rotate upwards. However, this configuration has a major disadvantage. When the propellers are in the vertical position, the prop wash acts directly downward onto the wing and creates a downward force which is analogous to negative lift. This loss in lift effectively reduces the aircraft's useful load. In the other method, the horizontal wing is permanently fixed to the propellers and pivots with the propellers. This method eliminates the negative lift problem but the method causes another problem. When the wing is pivoted up and the aircraft still has horizontal velocity, the entire surface of the wing is placed directly in the path of the airflow. The mass of air suddenly hitting this huge flat surface causes stability and control problems and further causes the wing to stall, when the apparent angle of attack exceeds approximately 15 degrees.

Aircraft employing multiple rotors that are symmetric about the fuselage also suffer from asymmetric loading during vertical flight due to a differential in power between the rotors, engines or a transmission failure. Such asymmetric loading presents a dangerous condition and as a result, these aircraft have cross-coupling and redundant transmissions to prevent this condition. The aircraft, as a result, becomes complicated, heavier and expensive.

Helicopters are limited in forward speed by compressible effects on the advancing rotor and further by the drag on the hub and fuselage. Furthermore, helicopters suffer a power drain due to the tail rotor being used to counteract the torque about the fuselage that is caused by rotating the rotors. Additional losses occur due to the resultant circulation induced in the prop wash. In vertical flight, the prop wash impinges upon the fuselage and further reduces lift and thus useful load.

There are two solutions in the prior art which address the above problems. U.S. Pat. No. 3,049,320 to Fletcher and U.S. Pat. No. 5,758,844 to Cummings. Fletcher uses a ducted fan located at the center of gravity to avoid asymmetric propulsion loads. However, the use of a large shroud or duct creates drag, comparable to that of a tilt wing, during transition. When horizontal velocity is present, substantial drag is caused by the rotation of the duct from the horizontal axis. Fletcher, as a result of this drag, is limited to forward flight only when the ducted fan is aligned horizontally. Furthermore, the payload in Fletcher is located at least a distance of the rotor radius from the center of gravity, thus making vertical flight and hover control extremely sensitive to payload weight and the resulting aircraft is given a large gross weight to reduce this sensitivity.

Cummings also uses a ducted fan and thus suffers from the same disadvantages as Fletcher and in addition suffers the same disadvantages attributed to the tilt wing. In addition, Cummings has two disadvantages.

First, the ducted fan and motor of Cummings rotate forward from a vertical axis to a horizontal axis. As a result, the center of gravity changes substantially forward to a position necessary for horizontal flight. As a result, the aircraft would be substantially less stable in forward flight when the duct is aligned on a vertical axis. This is an important factor, because the diminished horizontal flight capabilities in this configuration creates a safety problem, and degrades short landing performance.

Second, Cummings suffers from additional drag in both horizontal and vertical flight because the prop wash impinges directly upon the fuselage. The configuration in Cummings substantially impairs forward visibility in horizontal flight if the aircraft was used as a piloted aircraft.

Fletcher, Cummings, and helicopters have the vertical center of gravity located beneath the rotor which makes the aircraft inherently unstable in vertical flight and hover.

Fletcher, Cummings and other ducted fans and jets have high exit velocities that dislodge and throw objects on the ground such as rocks and other debris. This high exit velocity is a result of the high disk loading. Although high disc loading is advantageous for high speed horizontal flight, it causes a variety of problems during vertical take-off and landing on unimproved landing areas including persons in the vicinity of such takeoffs and landings.

SUMMARY OF INVENTION

The present invention is a uniquely configured tilt rotor aircraft capable of vertical and short take-offs and landings (V/STOL) and has inherent features that increase the aircraft's safety and performance. In horizontal flight, the aircraft uses a wing, as a lifting surface, coupled with either a horizontal tail or canard for longitudinal stability and control. A vertical tail is used for directional and roll stability with a conventional rudder. Furthermore, conventional control surfaces, such as ailerons, elevators and flaps, are used which are well known to those skilled in the art. The wing is a traditional form with a U shaped cut out in which a co-axial counter rotating rotor system is arranged.

In vertical flight or hover the aircraft is controlled by conventional cyclic pitch or by a plurality of deflectors located in the prop wash of the rotors. The location of the center of gravity above the rotor system coupled with the aerodynamic center of the vertical surface make the aircraft statically stable in the vertical flight and hover mode. The rotor system rotates from a vertical axis position through generally 90 degrees to a horizontal axis position. The rotor system provides vertical thrust in the vertical flight position and horizontal thrust in the horizontal position.

The fuselage is located generally directly above the forward half of the rotor system. The fuselage is supported from a forward connection to the leading edge of the wing. The location of the fuselage avoids the accelerated air flow of the prop wash. During vertical flight and hover, the fuselage is in the draw stream of the rotor system which has a higher velocity than the free stream, however, the velocity is substantially less than the velocity exiting the rotor system and therefore, the fuselage realizes less drag. In horizontal flight, the fuselage acts as an enlarged spinner directing the air stream to the outer regions of the rotor system where the majority of the thrust is produced. The cockpit is located in the fuselage. As a result of the fuselage's location along the longitudinal axis, eccentric lateral loading is eliminated and further the effect on the center of gravity due to payload variations are minimized. The location of the cockpit also provides superior visibility for the pilot since the line of sight is unobstructed.

This minimization of the variation of the center of gravity is important during vertical flight because the movement of the center of gravity away from the center of lift of the rotor system requires a restoring moment either through cyclic pitch or deflecting vanes, each of which reduce the useable lifting thrust of the rotor system.

The aircraft uses conventional landing gear that allows the aircraft to take-off and land when the rotor system is aligned along the horizontal axis. The conventional landing gear capability improves the safety of the aircraft during emergencies and further allows the aircraft to reduce the fuel consumption experienced during vertical take-offs and landings.

The configuration of the aircraft allows for transfer between horizontal forward flight and vertical flight without moving the center of gravity and without creating substantial drag that reduces the lift/drag (L/D) ratio. Maintaining the L/D ratio provides favorable flight characteristic regardless of the orientation of the rotor system. This flight performance permits the aircraft to glide to an emergency landing without the risks associated with autogyration and stalling of the wings that is associated with tilt wings.

The location of the single rotor system avoids eccentric asymmetric thrust during power loss or engine failure, that are associated with tilt rotors that use symmetrically opposed rotor systems. The rotor system position eliminates the need for cross-coupling and additional redundant systems, thus keeping the aircraft simple, low weight and inexpensive as compared to other tilt rotor and tilt wing aircraft.

The co-axial counter rotating rotor system reduces the power requirement by eliminating the need for torque compensating means. The second rotor recaptures the circulation that is induced in the prop wash by the first rotor. The co-axial counter rotating rotors decrease the disc loading compared to a single rotor during vertical flight and hover. A brake system stops the second rotor during high-speed forward flight thereby increasing the effective disc loading.

A plurality of engines reduces the deleterious effects of an engine failure situation, thus further improving the safety of the aircraft.

BRIEF DESCRIPTION OF THE DRAWINGS

The drawings illustrate, by way of example and not by way of limitation, several forms of the invention wherein like reference numerals designate corresponding parts in the several view in which.

DETAILED DESCRIPTION OF THE PREFERRED EMBODIMENTS

Figure 1:
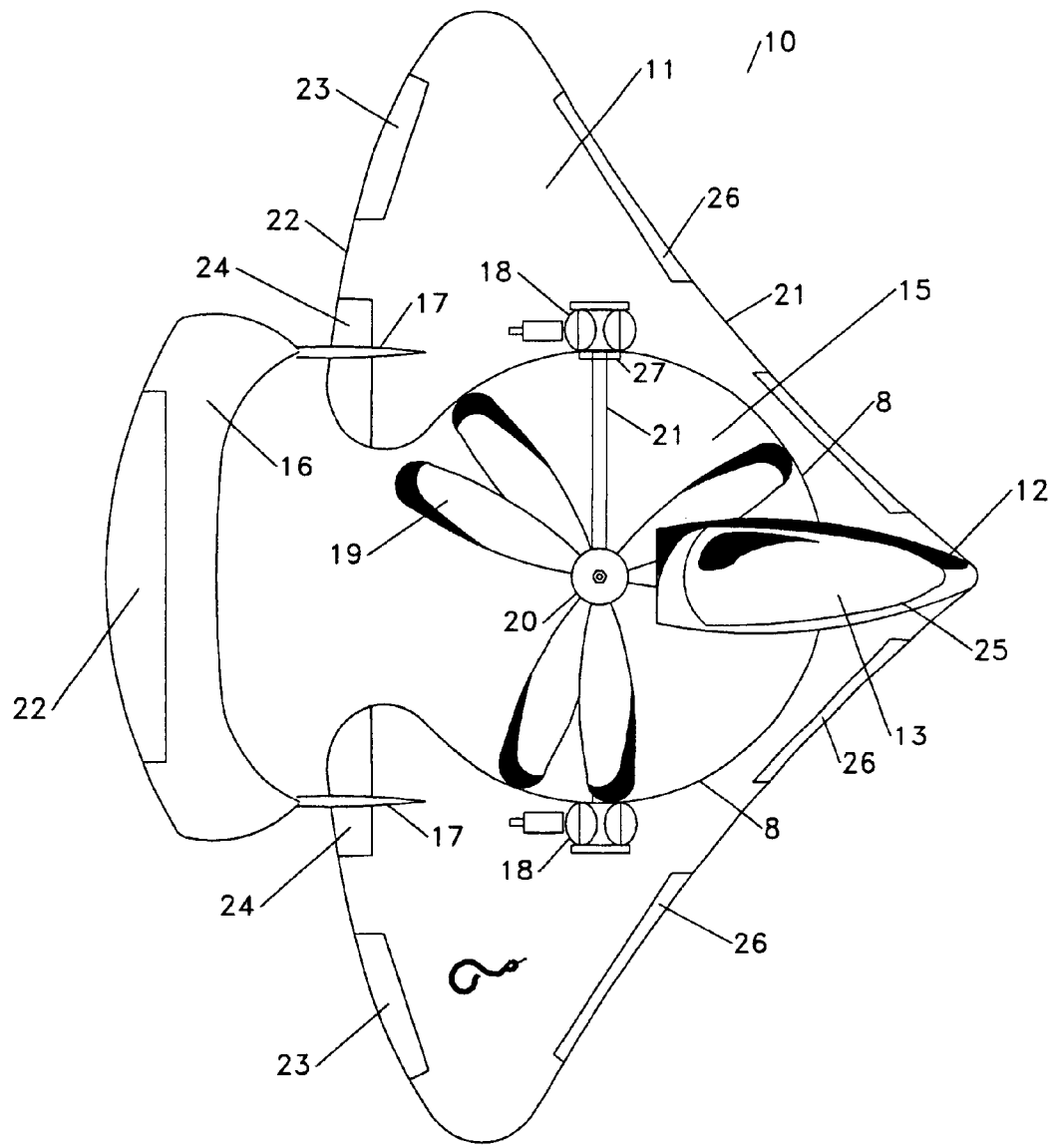
FIG. 1 is a top plan view of the present invention.
Figure 2:
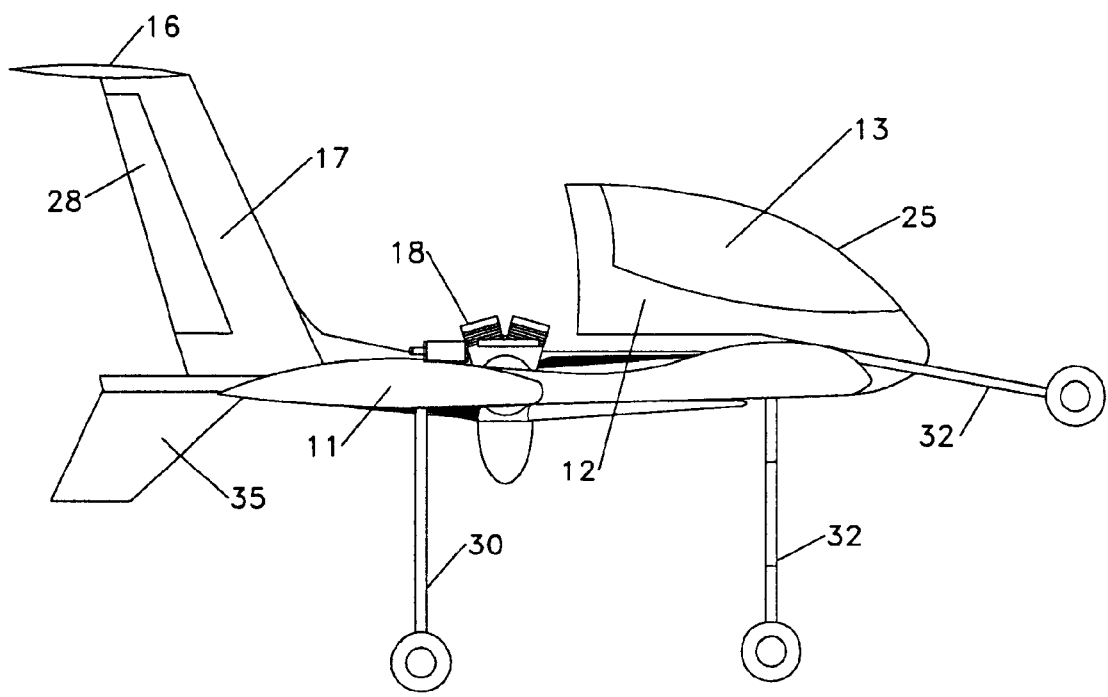
FIG. 2 is a side elevation view of the present invention.
Figure 3:
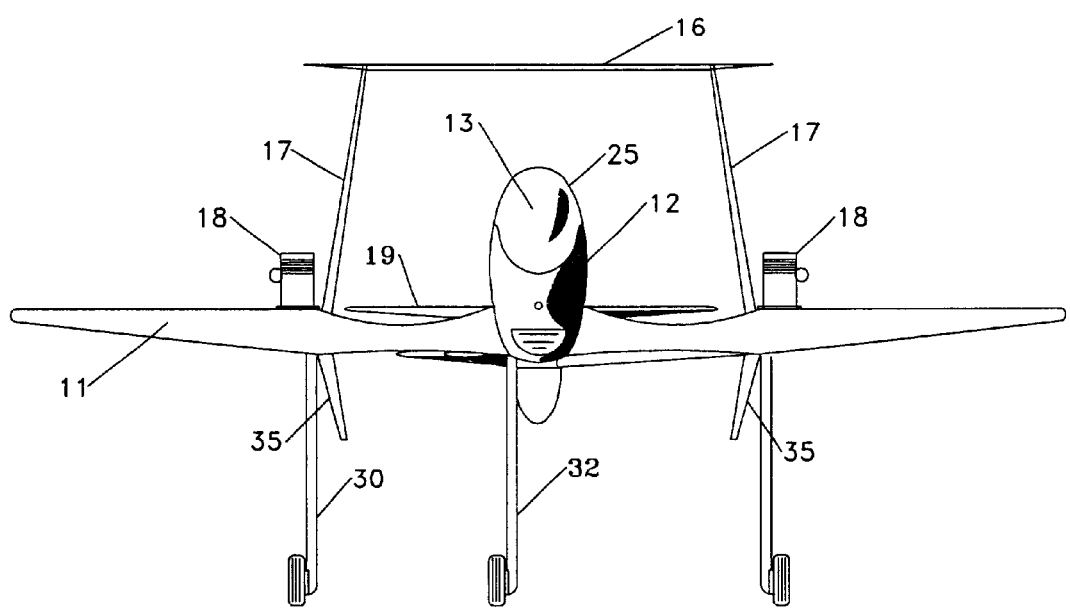
FIG. 3 is a front elevation view of the present invention.
Figure 4:
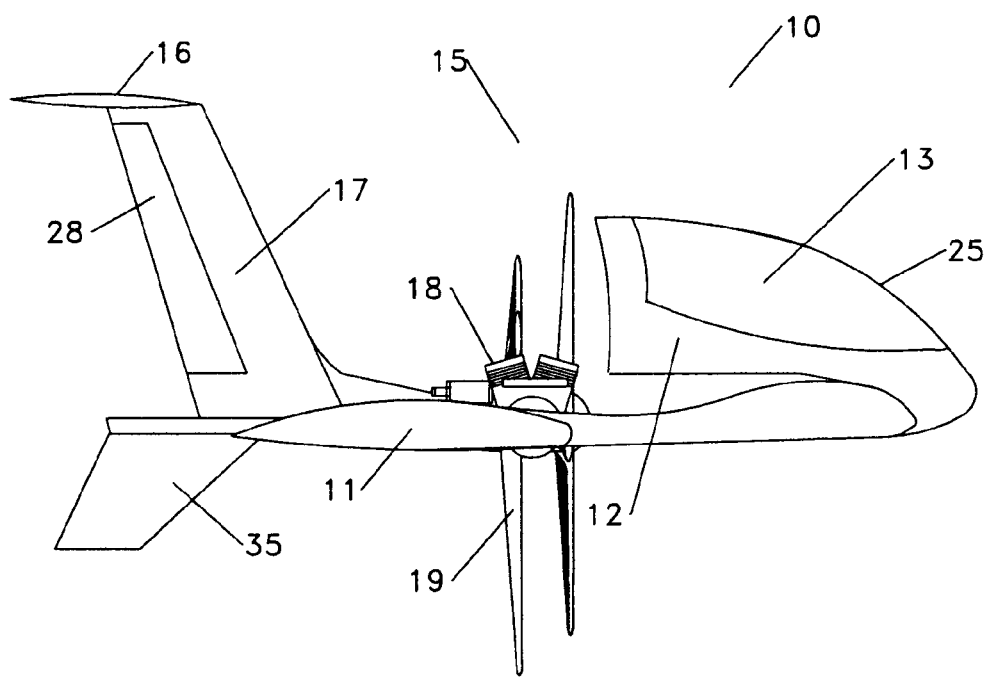
FIG. 4 is a side elevation view of the present invention in the forward flight mode with the rotor system in the horizontal position.

As can be seen from FIGS. 1–3 the vertical and short take-off and landing aircraft according to the present invention, which is designated generally by the reference number 10, includes a fuselage 12, fixed wings 11, horizontal stabilizer 16, vertical stabilizer 17, landing gear 30 and 32, appropriate control surfaces 22, 23, 24, 26 and 28, and a thrust providing rotor system 15, which in the illustrated embodiment comprises two co-axial counter-rotating rotors with two blades 19 on each rotor. The rotor system 15 being powered by two engines 18 which are located on the wings 11. The rotor system 15 is connected to the aircraft via the spar 21, and rotated around the spar by the rotation mechanism 27.

The wing 11 is a conventional cambered airfoil that provides substantially all of the lift for the aircraft in the forward flight mode and provides varying lift during transition from forward flight to vertical flight and vise versa. The wing 11 is of a general delta shape with a U shape opening 8 centered on the wings longitudinal axis with the open end extending to the trailing edge. The angle of incidence of the wing decreases from the wing root to the tip in a manner that is well know in the art. The wing has a low aspect ratio (AR) that gives the aircraft better performance during transition which is characterized by slow, high angle of attack flight. The low AR increases the angle of attack at which the wing will stall. The inboard portion of the wing is in the draw stream of the rotor system 15 and thus is exposed to a higher velocity than the portion of the wing 11 in the free stream. The wing 11 has a set of ailerons 23 for roll control and lift augmentation devices, which include flaps 24 on the trailing edge 22 of the wing and slats 26 on the leading edge 121. Dual vertical tails 17 extends from the wing 11 and the vertical tails 17 are swept back and are bridged on their upper end by a horizontal tail 16. The vertical tails 17 have a symmetric airfoil cross-section and each have a rudder 28 for forward flight directional stability and control. The vertical tail also aids in yaw and roll stability of the aircraft while in vertical flight and hover. A pair of downwardly projecting control surfaces 35 further enhance directional stability in both forward and vertical flight and are located beneath the left and right vertical tails 17 respectively. The horizontal tail 16 is a cambered airfoil and it is located vertically above the slipstream of the rotor system 15 and at a height that prevents the tail 16 from being blanketed by the wing 11. An elevator comprises the rear half of the horizontal tail 16 and provides longitudinal stability and control. Alternatively, the entire horizontal tail 16 can rotate as a fully articulated tail, which is well known in the art as a stabilator.

The fuselage 12 is located along the wing's longitudinal centerline and supported by the inboard portion of the wing 11. The fuselage 12 extends over the front half of the rotor system 15 located in the U shaped opening. The fuselage has a streamline body that is truncated at its aft end. The aft end of the fuselage terminates in front of the rotor system 15 when the rotor system is in the horizontal position and acts as a spinner for the rotor system 15. The fuselage contains a cockpit 13, over which is situated a canopy 25 that lifts off allowing ingress and egress. From the cockpit, the pilot is able to operate the aircraft and its related subsystems. The fuselage also has a cargo compartment.

The aircraft in the preferred embodiment has two engines 18 that are laterally spaced apart and imbedded in the wing 11. The engines are connected by a drive shaft within the spar 21 to the transmission 20 which in turn drives the rotors 19. The engines are air cooled and controllable from the cockpit 13 of the aircraft 10. The engines 18 in the preferred embodiment are interchangeable and thus rotate their respective drive shafts in opposite directions. The transmission could easily adapted to function with drive shafts rotating in the same direction. Turbojet engines could also be used. The engines 18 can be operated independently or collectively and supply power to the aircraft's auxiliary systems. The engines can be supercharged or turbo-charged as are well known in the art to improve performance.

Figure 5:
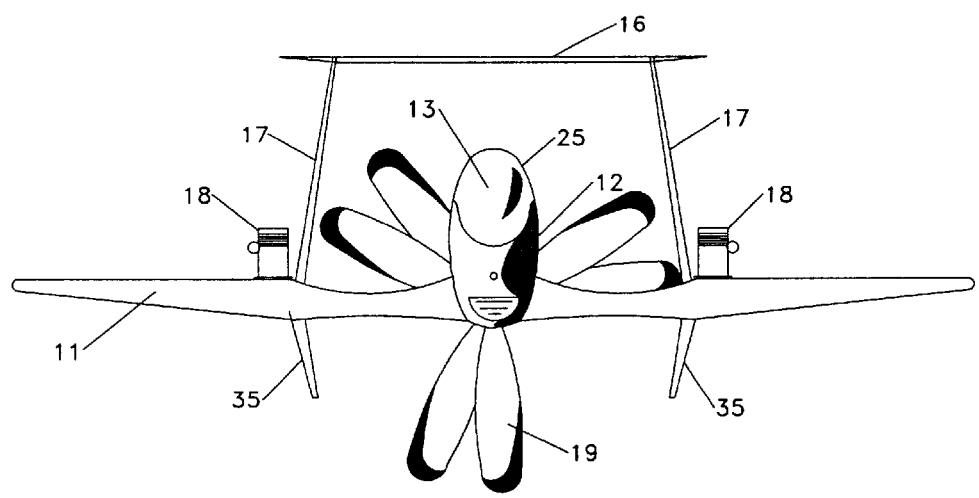
FIG. 5 is a front elevation view of the present invention in the forward flight mode with the rotor system in the horizontal position.
Figure 6:
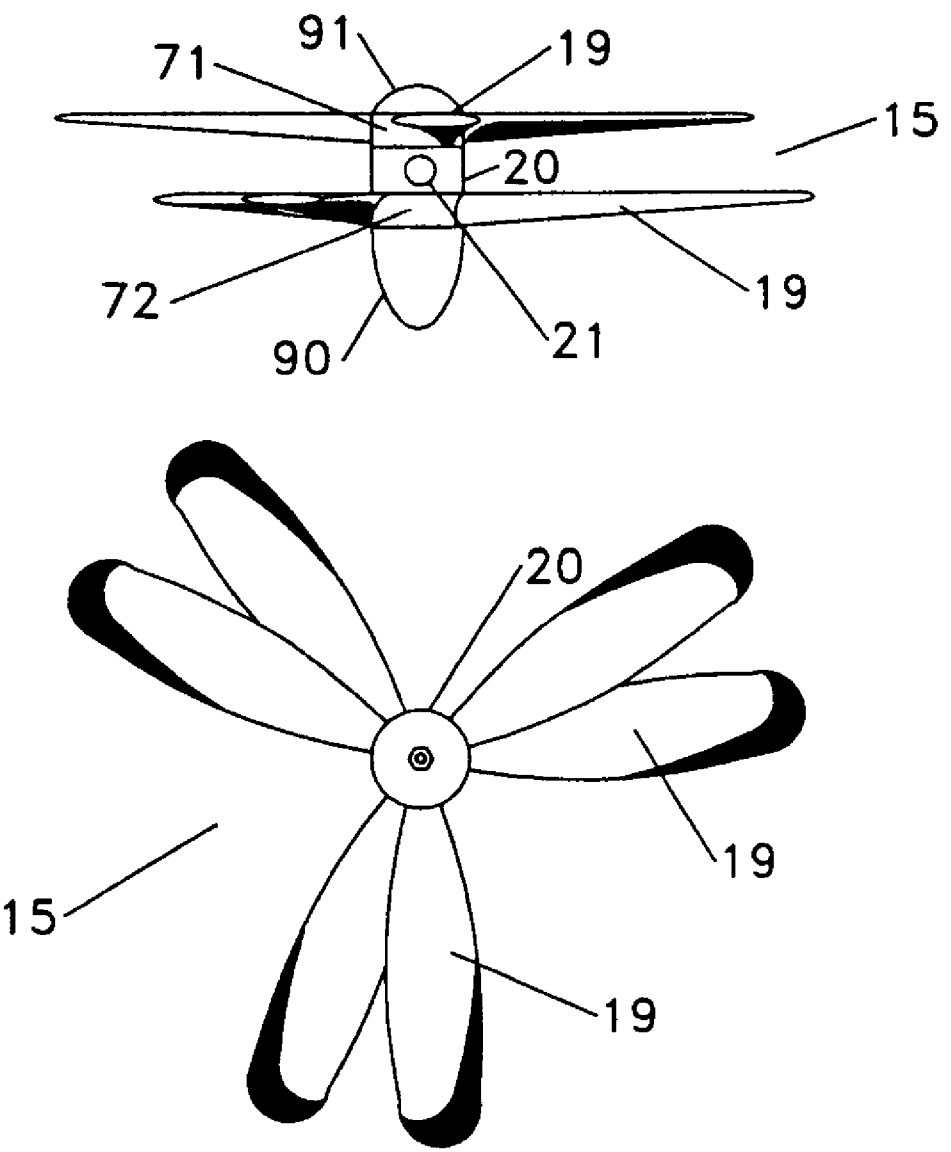
FIG. 6 is a detailed view of the rotor system.
Figure 9:
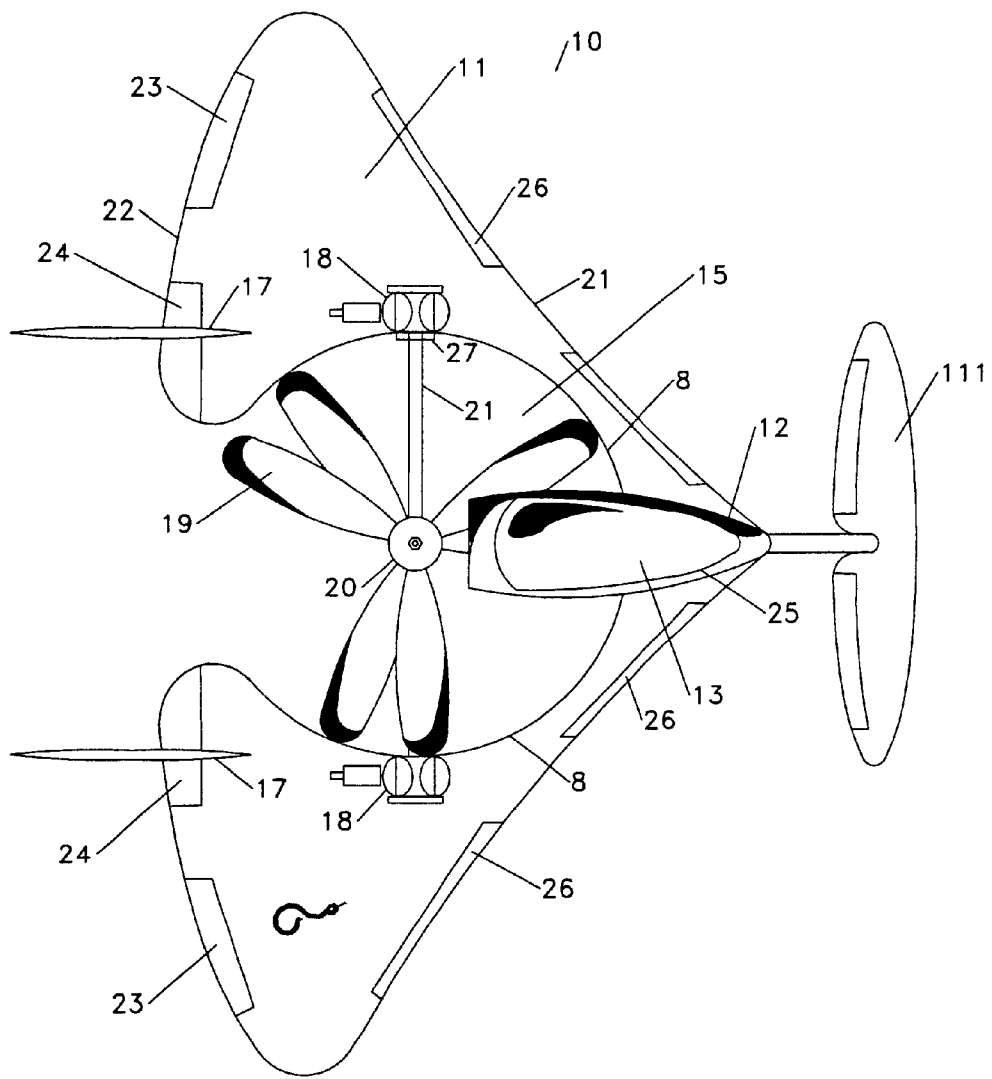
FIG. 9 is a top plan view of the present invention in a canard/wing configuration.

The rotor system 15 as seen in FIG. 6 comprises a set co-axial counter-rotating rotors, the set containing two rotors, each rotor with two rotor blades 19,. However, a plurality of rotor blades can be used. The rotors 19 are connected to the transmission 20 and are driven by the engines 18 as shown in FIG. 5. The rotor system rotates about the longitudinal axis of the spar by the rotating mechanism 27 as shown in FIG. 9. The rotating mechanism 27 is controllable from the cockpit 13 and is rotated via a worm gear or alternatively by hydraulic gears. The rotor system 15 has a rotation axis about which the rotor blades rotate. The rotation axis is positioned in a vertical position to provide vertical thrust for vertical take-off and landing and the rotation axis is positioned in a horizontal position during horizontal forward flight. The rotor system is rotateable so that the rotation axis of the rotors can be positioned throughout the spectrum between the vertical and horizontal positions.

Figure 7:
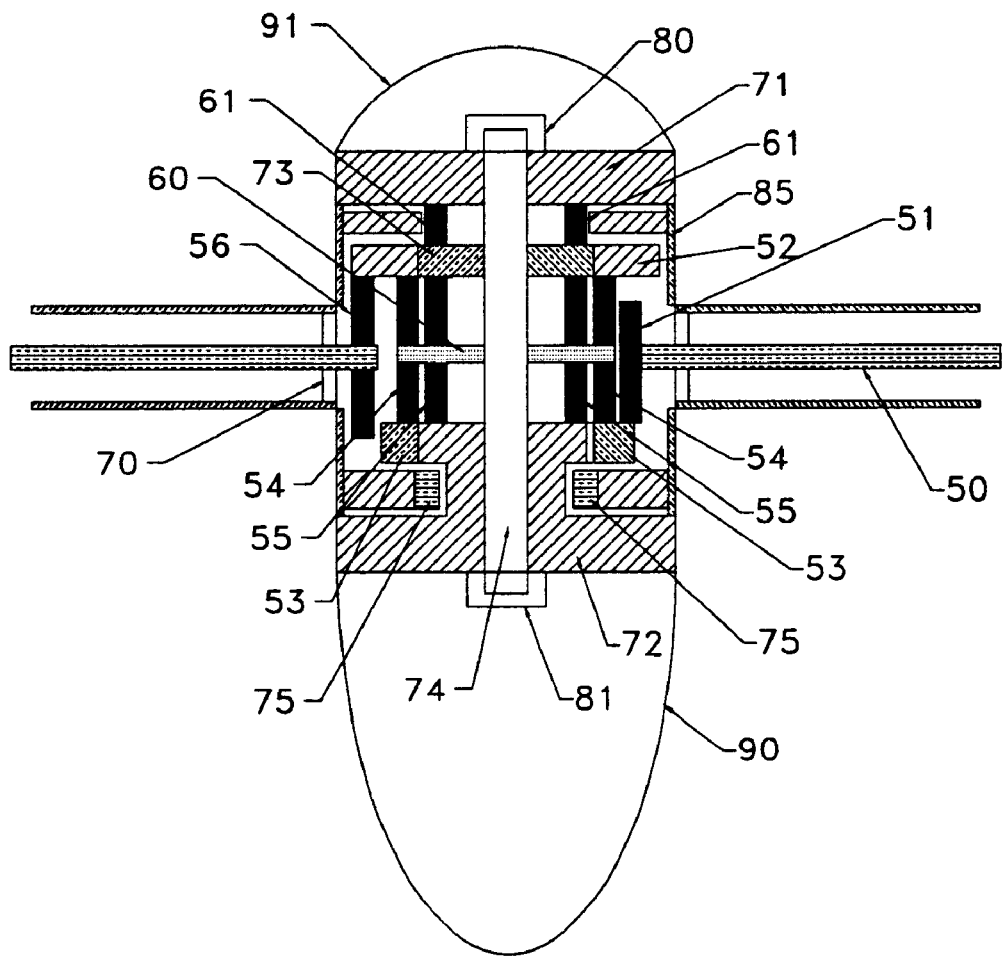
FIG. 7 is a detailed view of the rotor transmission.

The transmission 20, as seen in FIG. 7, transfers the power from the drive shafts 50 which are driven by the engines 18 to the two sets of rotors. The drive shafts 50 are supported at the transmission housing by the bearings 70. The transmission 20 utilizes a double planetary gear system. The power is delivered by two drive gears 51 and 56. The first of the two drive gears 56 drives the outer ring gear 52 while the second drive gear 51 drives the inter ring gear 53. The ring gears 52 and 53 are driven in a clockwise rotation. A spider hub 60 holds two sets of spider gears 55 and 54. The first of the spider gears 54 is located between and interacts with the inter and outer ring gears 52 and 53. The first spider gear 54 acts as a differential between the ring gears 52 and 53 effectively transferring the load to the engines without coordinating or matching the rotation speeds of the drive shafts 50. The rotation speed of the spider hub 60 rotates at the average of the two ring gears. This arrangement allows the rotor system to be operated by one engine with the gear ratio effectively reduced to match the reduction of power. The arrangement also allows the rotor system to operate with the engines providing unequal horsepower and still transfer the maximum power to the rotor blades. The second set of spider gears 55 is located between and interacts with the lower rotor hub 72 and the intermediate ring gear 73. The second set of spider gears 55, through the spider hub and the first set of spider gears 54 interacts with the inter and outer ring gears. The second set of spider gears 55 apply power equally to the two sets of rotors 19. A set of intermediate spider gears 61 are located between and interact with the intermediate ring gear 73 and the upper rotor hub 71. The intermediate spider gears 61 rotate between the ring gear 73 and the upper rotor hub 71, and are fixed to the transmission housing 85. This arrangement serves to reverse the rotation of the upper rotor from the lower rotor. The lower rotor hub 72 also has a set of brakes 75 fixed to the transmission housing 85 that operate to brake the lower hub, thus increasing the rotation of the upper rotor hub 71. The brakes are operateable from the aircraft's cockpit 13. The center shaft 74 retains the rotor hubs and serves as a bearing mount for several of the transmission components. The center shaft 74 is secured at the ends by lock nuts 80 and 81. The drive shafts have directional locking bearings, not shown, which prevent the shafts from rotating backwards when the respective engine is not in operation. Additionally and alternatively, a clutch system can be introduced to the transmission 20 to allow for autogyration without drag from the engines. The top of the upper rotor hub 71 has a nose cone 91 and the lower rotor hub 72 has a tail cone 90 to reduce the drag due to the slipstream fore and aft of the rotors.

The rotor system of the preferred embodiment has a cyclic pitch and collective pitch control, with a variable attitude swash plate. The rotor system 15 can vary the pitch or angle of attack of the rotor blades 19 thereby varying the respective lift of the blades. Mechanisms for the application of collective and cyclic pitch are well known in the art. The application of cyclic pitch allows the aircraft to be controlled in hover and transition. The application of collective pitch allows the thrust generated to be varied without directly changing the RPMs of the engines.

Figure 8:
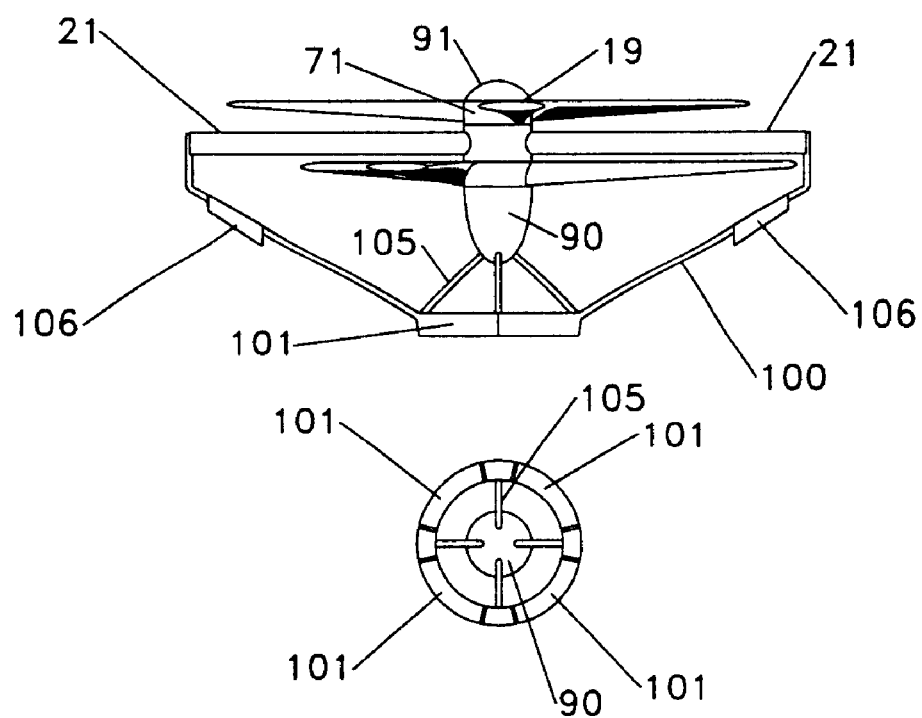
FIG. 8 is a detail view of the rotor system with guide vanes and frame.

Alternatively the rotor system can be equipped with guide vanes to provide control during hover and vertical flight. The guide vanes 101 and 106, as seen in FIG. 8, are located in the prop wash of the rotor system 15 and rotate along with the rotor system 15. The guide vanes 101 and 106 are mounted on a frame 100. The frame 100 is further supported by legs 105 that are attached to the tail cone 90 The guide vanes are controllable from the cockpit 13. The guide vanes 101 can be moved individually or collectively achieve roll and pitch control during hover and vertical flight. The guide vanes 106 are used to control yaw. The guide vanes 101 and 106 produce controlling moments by deflecting the prop wash. All of the guide vanes are hinged and can be released to orient themselves parallel to the free stream to reduce drag while the aircraft has a significant forward velocity and when the rotor system is not in the horizontal position.

FIG. 9 shows the present invention with a canard 111 in lieu of a horizontal tail. The canard supplies lift and a compensating moment to the wing's downward pitching moment, such a configuration decreases the induced drag by reducing the necessary coefficient of lift of the wing as compared to a conventional horizontal tail. Whether in a canard or conventional tail configuration, the aircraft has both positive static and dynamic stability in forward flight. Alternatively the aircraft can use computer control that would achieve control and stability without relying on the inherent stability from the aircraft's aerodynamic structure.

Figure 10:
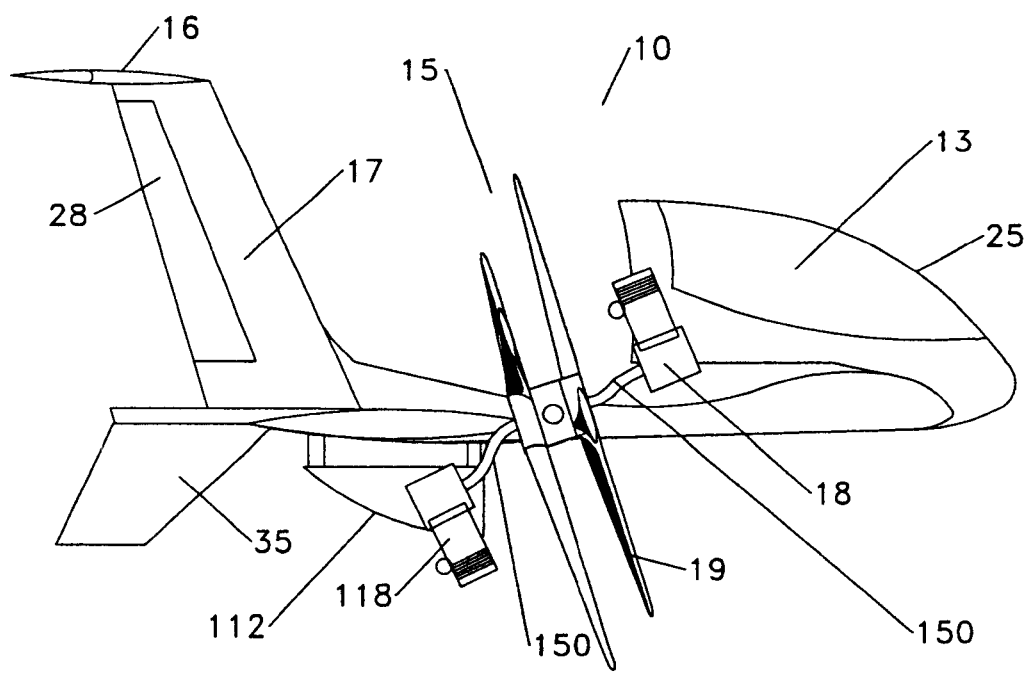
FIG. 10 is a cut away elevation side view of the present invention with an engine in the fuselage.

An alternative embodiment of the aircraft, as seen in FIG. 10, has the engine 18 located in the aft portion of the fuselage. The power is transmitted to the transmission and the rotor system by a drive shaft 150 with a set of universal joints. The engines crank shaft is co-planar with the vertical and horizontal axis of the rotor system and is oriented at a 45 degree angle from the horizontal to minimizes torque on the universal joints throughout transition between the horizontal and vertical positions of the rotor system 15. The drive shaft 150 enters the transmission from the top. The transmission 20 is altered structurally but maintains the characteristics included in the preferred embodiment as discussed previously. The position of the engine 18 minimizes the moment of inertia in yaw and roll thus reducing the power required of the control surfaces during maneuvering flight. Furthermore, the engine 18 or a second engine 118 can be located in a pod 112 beneath the aft portion of the rotor system. In this position, the engine would be exposed to the prop wash of the rotor system but would advantageously affect the location of the center of gravity in vertical flight. The engine would be operably connected to the rotor system in the same manner as described for the engine located in the fuselage and would be mounted to the aft portion of the wing halves by a set of streamlined struts.

The aircraft can also utilize a single rotor with any of the configurations discussed previously. This embodiment includes a counter torque means such as guide vanes or tail rotor, which are well known in the art.

The aircraft in the embodiments is advantageously constructed out of composite materials for lightweight but other materials used in aerospace applications are also envisioned.

Although the present invention has been described in considerable detail with regard to the preferred version thereof, other versions are possible. Therefore, the appended claims should not be limited to the description of the preferred version contained herein.

What is claimed is:

1. A vertical/short take-off and landing air vehicle capable of producing high speed horizontal flight comprising:

a) a fuselage;
b) a lifting surface comprising at least one wing, said wing with a substantially U shape opening forming substantially two laterally disposed wing halves, where an open end of said U shape opening is positioned at a trailing edge of said wing;
c) an articulated rotor system attached between said laterally disposed wing halves in said U shape opening comprising:
   a set of coaxial counter-rotating rotors; interconnected by a transmission;
d) a power source operably connected to said rotor system through said transmission;
wherein said rotor system is positional in a substantially vertical position to provide sufficient direct vertical thrust for vertical take-off and landing and is directable to other positions to provide a varying spectrum of take-off and landing configurations as well as a substantially horizontal position for high speed horizontal flight;
said fuselage being substantially disposed over a front half of said rotor system when said rotor system is in said vertical position, and disposed in front of said rotor system when said rotor system is in said horizontal position.

2. The air vehicle of claim 1, wherein said air vehicle defines a longitudinal center line
and said fuselage has a longitudinal central axis;
wherein said air vehicle's longitudinal center line and said fuselage's longitudinal central axis are co-planer; and
wherein during substantially horizontal flight, said longitudinal central axes of said rotor system is parallel with said longitudinal center line of said air vehicle; and
wherein during substantially vertical flight, said rotor system is rotateable to a position such that said longitudinal central axis of said rotor system is substantially perpendicular to said longitudinal center line of said air vehicle.

3. The air vehicle of claim 1, further comprising a plurality of directional control surfaces connected to said wing.

4. The air vehicle of claim 1, wherein said air vehicle further comprising in addition to said wing at least one horizontal airfoil for longitudinal stability and control, said horizontal airfoil having a control device attached thereto.

5. The air vehicle of claim 4, wherein said horizontal airfoil is a horizontal tail disposed on the upper portion of two directional control surfaces and extending horizontally between said directional control surfaces.

6. The air vehicle of claim 1, wherein said transmission of said rotor system has a means to brake one of said co-axial counter rotating rotors, thereby increasing the rotational speed of the other said co-axial counter rotating rotor.

7. The air vehicle of claim 1, wherein the said power source is a pair of engines disposed on said wing and laterally spaced apart from each other by said rotor system; and operably connected to said transmission.

8. The air vehicle of claim 7, wherein said transmission further has means to allow said rotor system to produce thrust with only one of said engines operable.

9. The air vehicle of claim 1, wherein the said power source is an engine located in said fuselage and operably connected to said transmission.

10. The air vehicle of claim 1, wherein said rotor system has means to provide controllable cyclic pitch on at least one of said set of coaxial counter-rotating rotors for controlling said air vehicle in a substantially vertical flight mode.

11. The air vehicle of claim 1, wherein said rotor system has a plurality of controllable guide vanes connected to a frame in the slipstream of said co-axial counter rotating rotors for controlling said air vehicle in a substantially vertical flight mode.

12. The air vehicle of claim 1, wherein said rotor system comprises means to provide controllable collective pitch on at least one of said set of coaxial counter-rotating rotors for varying an advancing rate of said coaxial counter-rotating rotor.

13. The air vehicle of claim 1, wherein the aircraft further comprising:
   a) a retractable nose gear extending from said fuselage; and
   b) a pair of retractable landing gear extending from said wing;
   wherein said nose gear and said landing gear are outside of the slipstream of said rotor system; and,
   said nose gear and said landing gear are of a sufficient length to enable said air vehicle to land with said rotor system in said substantially horizontal position.

14. The air vehicle of claim 1, wherein the fuselage, further comprises a cockpit and cargo area.

15. The air vehicle of claim 1, wherein said air vehicle is capable of forward gliding flight when said rotor system is in said substantially vertical position.

16. The air vehicle of claim 1, wherein the first moment of area of the side profile of said air vehicle is disposed above said air vehicle's center of gravity.

17. The air vehicle of claim 1, wherein the said air vehicle's center of gravity is disposed above the vertical center of lift of said rotor system, when said rotor system is in said substantially vertical position.

18. The air vehicle of claim 1, wherein the said power source is an engine contained in a pod disposed under the aft portion of said rotor system and operably connected to said transmission; wherein location of said pod allows said rotor system, without interference, to rotate from said vertical position to said horizontal position.

19. A vertical/short take-off and landing air vehicle capable of producing high speed horizontal flight comprising:
   a) a fuselage;
   b) a lifting surface comprising at least one wing, said wing with a substantially U shape opening forming substantially two laterally disposed wing halves, where an open end of said U shape opening is positioned at a trailing edge of said wing;
   c) an articulated rotor system attached between said laterally disposed wing halves in said U shape opening;
   d) a power source operably connected to said rotor system;
   e) a means to counter act the torque caused by the rotation of said rotor during substantially vertical flight and hover;
   wherein said rotor system is positional in a substantially vertical position to provide sufficient direct vertical thrust for vertical take-off and landing and is directable to other positions to provide a varying spectrum of take-off and landing configurations as well as a substantially horizontal position for high speed horizontal flight;
   said fuselage being substantially disposed over a front half of said rotor system when said rotor system is in said vertical position, and disposed in front of said rotor system when said rotor system is in said horizontal position.

20. A vertical/short take-off and landing air vehicle capable of producing high speed horizontal flight comprising:
   a) a fuselage;
   b) a lifting surface comprising at least one wing with control devices attached thereto; said wing with a substantially U shape opening forming substantially two laterally disposed wing halves, where a open end of said U shape opening is positioned at a trailing edge of said wing;
   c) an articulated rotor system attached between said laterally disposed wing halves in said U shape opening comprising:
      i) a set of coaxial counter-rotating rotors; interconnected by a transmission; each of said rotors comprising at least two rotor blades;
      ii) a power source operably connected to said rotor system through said transmission;
   wherein said rotor system is positional in a substantially vertical position to provide sufficient direct vertical thrust for vertical take-off and landing and is directable to other positions to provide a varying spectrum of take-off and landing configurations as well as a substantially horizontal position for high speed horizontal flight;
   said fuselage being connected to a leading edge of said wing and substantially disposed over a front half of said rotor system when said rotor system is in said vertical position, and disposed in forward of said rotor system when said rotor system is in said horizontal position;
   wherein said air vehicle defines a longitudinal center line and said fuselage has a longitudinal central axis;
   wherein said air vehicle's longitudinal center line and said fuselage's longitudinal central axis are co-planer;
   wherein during substantially horizontal flight, said longitudinal central axes of said rotor system is parallel with said longitudinal center line of said air vehicle;
   wherein during substantially vertical flight, said rotor system is rotateable to a position such that said longitudinal central axis of said rotor system is substantially perpendicular to said longitudinal center line of said air vehicle;
   further comprising a plurality of directional control surfaces connected to trailing edge of said wing;
      wherein said air vehicle further comprising in addition to said wing at least one horizontal airfoil for longitudinal stability and control, said horizontal airfoil having a control device attached thereto; wherein said horizontal airfoil is a horizontal tail disposed on the upper portion of two of said directional control surfaces and extending horizontally between said directional control surfaces;
      wherein said transmission of said rotor system has a means to brake one of said co-axial counter rotating rotors, thereby increasing the rotational speed of the other said co-axial counter rotating rotor;
      wherein the said power source is a pair of engines disposed on said wing and Laterally spaced apart from each other by said rotor system; and operably connected to said transmission;
      wherein said transmission further has means to allow said rotor system to produce thrust with only one of said engines operable; and,
      wherein said rotor system has means to provide controllable cyclic pitch to at least one of said set of coaxial counter-rotating rotors for controlling said vehicle in a substantially vertical flight mode.

21. A vertical/short take-off and landing air vehicle capable of producing high speed horizontal flight comprising:

a) a fuselage;

b) a lifting surface with an opening;

c) an articulated lift rotor system rotatable with respect to said fuselage and disposed in said opening comprising; a set of coaxial counter-rotating rotors; interconnected by a transmission;

d) a power source operably connected to said rotor system through said transmission;

wherein said rotor system is positional in a substantially vertical position to provide sufficient direct vertical thrust for vertical take-off and landing and is directable to other positions to provide a varying spectrum of take-off and landing configurations as well as a substantially horizontal position for high speed horizontal flight;

said fuselage being substantially disposed over a front half of said rotor system when said rotor system is in said vertical position, and disposed in front of said rotor system when said rotor system is in said horizontal position.

* * * * *